Sept. 25, 1928.  P. J. McCULLOUGH  1,685,498
MAGNETIC PULLEY
Filed Jan. 12, 1927
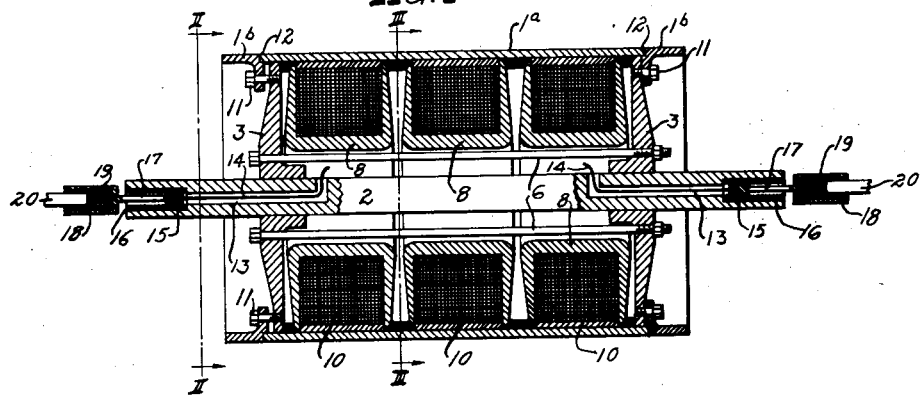
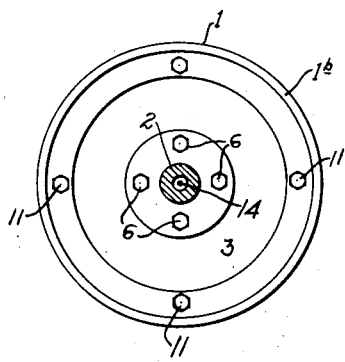
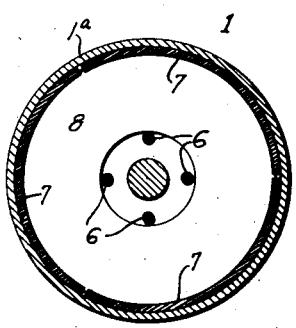
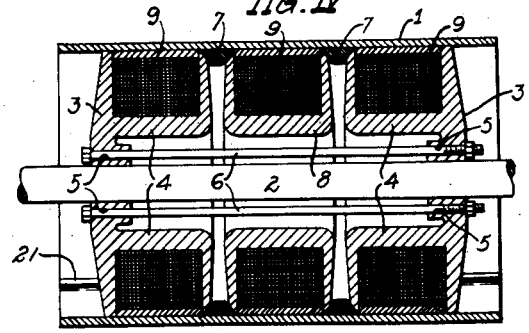
INVENTOR
P. J. McCULLOUGH
BY
ATTORNEY Patented Sept. 25, 1928.

1,685,498

UNITED STATES PATENT OFFICE.

PAUL J. McCULLOUGH, OF ST. LOUIS, MISSOURI, ASSIGNOR TO SCULLIN STEEL CO., OF ST. LOUIS, MISSOURI, A CORPORATION OF DELAWARE.

MAGNETIC PULLEY.

Application filed January 12, 1927. Serial No. 160,756.

My invention relates to improvements in magnetic pulleys, and has for its object to provide an efficient and economical structure of this character which may be readily assembled or disassembled with a minimum number of parts, and one in which the proper magnetic contact is always secured.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. I is a cross-sectional view of my improved device.

Fig. II is a view taken along the line II—II, Fig. I.

Fig. III is a view taken along the line III—III, Fig. I.

Fig. IV is a cross-sectional view of a modification of my device which, in practice, will be my preferred form.

In the drawing, 1 designates a non-magnetic manganese steel drum (Fig. IV) which extends across the face of the pulley. 2 is the pulley shaft upon which are mounted end plates 3, which are preferably keyed to the shaft 2 so as to positively rotate with said shaft. In the structure shown in Fig. IV the end plates 3 have cast integral therewith a spool, or coil retainer, 4. Apertures 5 are provided in the end plates for the reception of bolts 6, which are adapted to pull said end plates together.

7 are expanding wedge rings adapted to be located between the end spools 4 and the intermediate spool 8 at the outer periphery of said spools, so that when the end plates 3 are drawn toward each other by the bolts 6 the spools will wedge against the wedge rings 7, thus forcing said wedge rings out into firm engagement with the drum 1. It will be noted that the edges of the spools that contact with the wedge rings 7 are inclined, for the purpose of insuring a close fit between the spools and the rings, and furthermore, such a provision permits the edges of the spools contacting with the rings to serve as cams in forcing the rings radially outward from the shaft 2 to press firmly against the inside of the drum 1. In Fig. III it will be noted that these wedge rings are in sections, so that they may readily expand. 9 designates the magnetic coils contained in the spools 4 and 8. 10 is mica or other insulating material placed between the magnetic coil 9 and the drum 1.

In the structure shown in Figs. I and II, the drum 1ª is formed of steel and the end rings 1ᵇ are of non-magnetic metal and are bolted to the end plates 3 by bolts 11. A recessed joint 12 is provided between the steel drum 1ª and the non-magnetic ends 1ᵇ, so that a smooth surface may be provided for the belt (not shown) that engages said pulley.

In Fig. I it will be noted that the shaft 2 is provided with longitudinal perforations 13 whereby the wires 14 for energizing the magnetic coils 9 are permitted to enter the pulley. The wires 14 contact with armatures 15 which are screwed in insulated bushings 16 located in an enlargement of the perforations 13 of the shaft 2. 17 are contact brushes which are adapted to contact with the armatures 15. The armatures 15 are adapted to revolve while the contact brushes 17 remain stationary. 18 are non-rotatable members mounted in close proximity to the ends of the shaft 2. 19 are pressure springs whereby the contact brushes 17 are kept constantly in contact with the armatures 15. 20 are bars leading to the electric feed wires.

It may be noted that the members 18 are mounted for non-rotation but they are keyed into their supports, thereby permitting reciprocal movement of the members 19. The bars 20 are secured to a support and insulated from said support.

The non-magnetic manganese shell shown in Fig. IV is made in a flat plate-like form and then rolled into a drum, which drum is welded together, leaving a ridge on the interior surface thereof as shown at 21. This ridge serves as a key so that said drum 1 may be keyed to the end plates 3 in suitable keyways (not shown) provided in said end plates 3. Thus the drum 1 is adapted to positively rotate with said end plates 3.

I claim:

1. In a device of the character described, a shaft, end plates mounted upon said shaft and adapted to rotate therewith, a drum supported by said end plates, spools mounted in said drum, magnetic coils mounted in said spools, means for drawing said end plates toward each other, and expansible rings located between the outer ends of said spools so that when said end plates are drawn toward each other said rings are contacted against the inner surface of said drum and the outer edges of said spools, substantially as described.

2. In a device of the character described, a shaft, end plates mounted upon said shaft and adapted to rotate therewith, a non-magnetic drum supported by said end plates, spools mounted in said drum, magnetic coils mounted in said spools, means for drawing said end plates toward each other, and expansible rings located between the outer ends of said spools so that when said end plates are drawn toward each other said rings contact against the inner surface of said drum and the outer edges of said spools, substantially as described.

3. In a device of the character described, a shaft having an axial longitudinal perforation for the reception of electric wires, end plates mounted upon said shaft and adapted to rotate therewith, a drum supported by said end plates, spools mounted in said drum, magnetic coils mounted in said spools, said magnetic coils being connected with said electric wires, means for drawing said end plates toward each other, and expansible rings located between the outer ends of said spools so that when said end plates are drawn toward each other said rings are contacted against the inner surface of said drum and the outer edges of said spools, substantially as described.

4. In a device of the character described, a shaft, end plates mounted upon said shaft and adapted to rotate therewith, a series of bolts connecting said end plates, a drum supported by said end plates, spools mounted in said drum, magnetic coils mounted in said spools, expansible rings located between the outer ends of said spools, and means comprising the aforementioned bolts for drawing said end plates toward each other whereby said rings are contacted against the inner surface of said drum and the outer edges of said spools, substantially as described.

5. In a device of the character described, a shaft, end plates mounted upon said shaft and adapted to rotate therewith, a spool integrally connected with each of said end plates, magnetic coils mounted in said spools, a drum supported by said end plates, an expansible ring located between the outer adjoining ends of said spools, and means for drawing said end plates toward each other whereby said ring is contacted against the inner surface of said drum and the outer edges of said spools, substantially as described.

6. In a device of the character described, a shaft, end plates mounted upon said shaft and adapted to rotate therewith, a drum supported by said end plates, spools mounted in said drum, magnetic coils mounted in said spools, and a rib provided on the interior surface of said drum for entry into keyways in said end plates whereby said drum is adapted to rotate with said end plates, substantially as described.

In testimony that I claim the foregoing I hereunto affix my signature.

PAUL J. McCULLOUGH.